United States Patent [19]
Dailey

[11] 3,961,015
[45] June 1, 1976

[54] COMBINED HYDROLYSIS AND ABSORPTION PROCESS AND APPARATUS THEREFOR

[75] Inventor: Lawrence W. Dailey, Los Angeles, Calif.

[73] Assignee: Societe Nationale des Petroles d'Aquitaine, Paris, France

[22] Filed: Aug. 21, 1969

[21] Appl. No.: 851,926

[52] U.S. Cl. .............................. 423/229; 423/243
[51] Int. Cl. ........................................... B01d 53/34
[58] Field of Search ............... 23/2, 3, 3.3, 2.3, 260, 23/283

[56] References Cited
UNITED STATES PATENTS

| | | | |
|---|---|---|---|
| 2,594,311 | 4/1952 | Johnson et al. | 23/2 X |
| 2,826,601 | 3/1958 | Barsky | 23/283 X |
| 2,878,099 | 3/1959 | Breuing et al. | 23/2 |
| 3,098,705 | 7/1963 | Bally | 23/3 |
| 3,387,917 | 6/1968 | Walles et al. | 23/2 |

Primary Examiner—Earl C. Thomas
Attorney, Agent, or Firm—Christie, Parker & Hale

[57] ABSTRACT

In a continuous process for the selective absorption of constituents from a gas stream where a component is reacted to form absorbable constituents, recovery per unit volume of absorbent is improved by passing the gas through a low temperature mass absorption zone, a high temperature reaction-absorption zone and a final low temperature absorption zone, the absorption solution from the final absorption and reaction-absorption zones being combined to form the absorption solution of the mass absorption zone.

6 Claims, 1 Drawing Figure

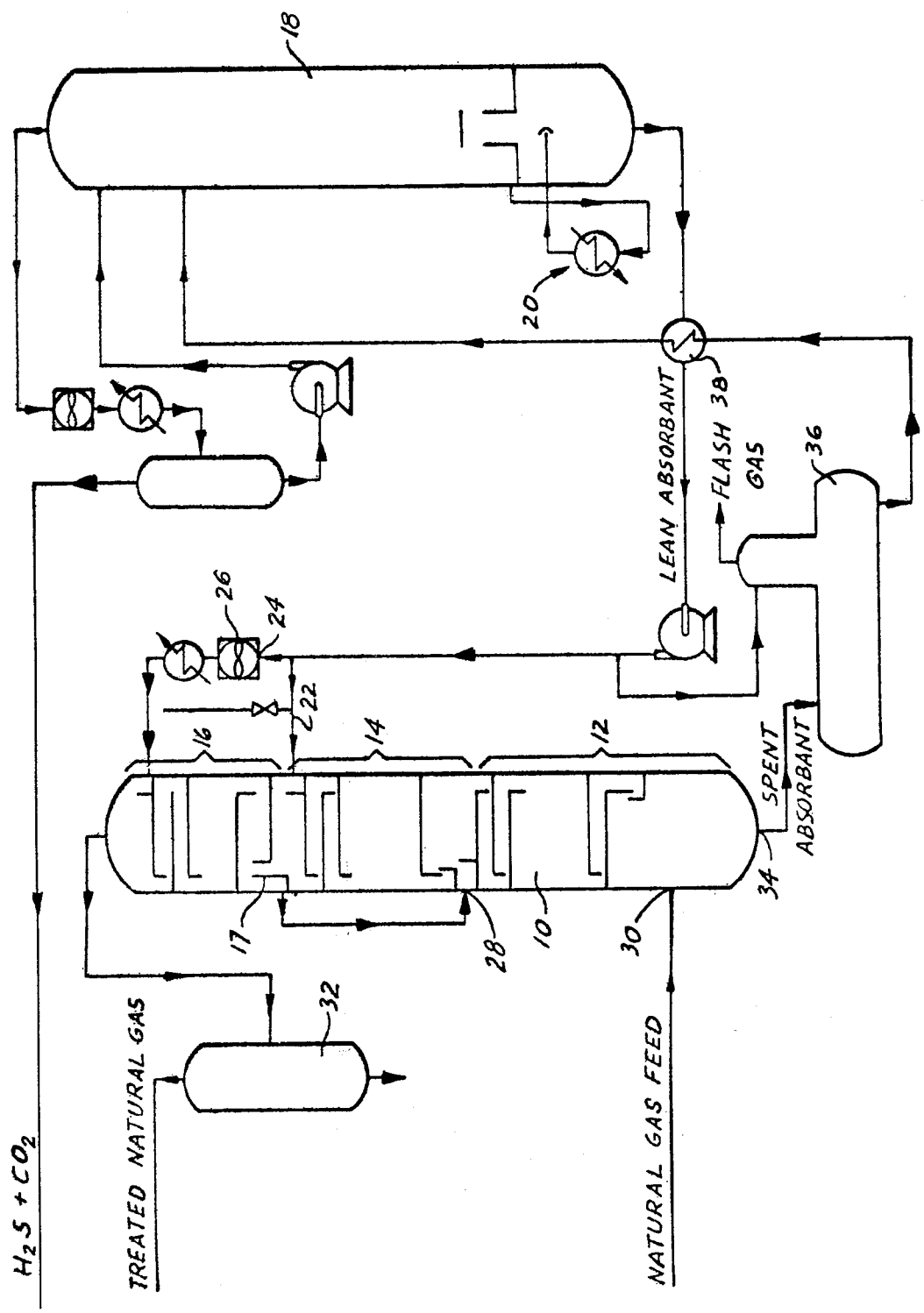

COMBINED HYDROLYSIS AND ABSORPTION PROCESS AND APPARATUS THEREFOR

BACKGROUND OF THE INVENTION

The present invention relates to a vapor-liquid absorption process where chemical reactions occur.

In the processing of gas streams for industrial and domestic purposes, absorption columns are widely used to remove undesired components. Some components are, however, difficult to absorb. A convenient way to recover them is to react them in situ to form absorbable reaction products. This normally requires an increase in solution temperatures which normally reduces the absorptivity, requiring, therefore, more absorbent to extract a given quantity of undesirable components from the gas stream.

SUMMARY OF THE INVENTION

It is now found that in a combined chemical reaction-absorption system more absorption per unit volume of absorption solution can be achieved in a three-stage, countercurrent, vapor-liquid absorption process in which the gas stream is contacted in a first absorption zone in countercurrent flow with an absorbent solution maintained at a net temperature conducive to mass absorption of absorbable impurities. The gas stream is then contacted in a second absorption-reaction zone in countercurrent flow with an absorbent at a temperature at which reactive impurities will react to form absorbable impurities. The gas stream from the second absorption zone in a third absorption zone is passed in direct countercurrent flow with a cool, lean absorption solution to remove the products of the reaction and any remaining gas impurities. The absorption solutions from the second absorption-reaction zone and the third absorption zone are combined to form the absorption solution for the first absorption zone.

In this process mass absorption occurs in the first absorption zone, the effluent of which is passed directly to an absorbent recovery zone before it is raised to a temperature where it can release absorbed constituents to the process gas stream.

There is also provided, in accordance with this invention, an improved apparatus to carry out vapor-liquid absorptions accompanied by chemical reaction.

DRAWING

The attached Drawing illustrates preferred apparatus to carry out the practice of the process of this invention.

DESCRIPTION

The present invention provides an improved continuous process and apparatus to carry out absorption extraction of impurities from a gas stream where it is necessary to carry out some conversion reaction to remove an impurity.

Generally, the process is a three-stage process involving countercurrent vapor-liquid absorption in a first absorption zone, an absorption-reaction zone and a final absorption zone.

The first absorption zone, which may be termed a mass absorption zone, is used to absorb most of the undesired absorbable impurities from the process gas stream. The absorption solution used in this stage flows countercurrent to the gas stream and is formed by combination of the absorption fluid streams from the second and third zones. It is at a net temperature which facilitates a high degree of absorption of absorbable components per unit volume of absorbent.

The process gases leaving the first absorption zone pass to a second absorption-reaction zone for countercurrent contact with an absorption solution at an elevated temperature for a time sufficient to convert at least one of the otherwise unextractable components to absorbable components. Although chemical conversion is the objective in this zone, some absorption also occurs. As indicated, the absorption solution from this zone is continuously combined with the absorption solution from the third stage at a point just prior to the first stage and fed to the first stage for mass gas absorption.

After passing through the second zone, the process gas stream passes to a third absorption zone for countercurrent contact with a cooled, lean absorption solution where the reaction products and any remaining extractable components are absorbed.

The mass absorption fluid leaving the first zone is generally saturated with respect to the impurities and normally is returned to a stripping system where extracted components are recovered and absorption solution returned to the contactor for reuse.

More particularly, and with reference to the Drawing, the process of this invention and the description of the apparatus used therein will be readily understood in terms of a discussion of the treatment of natural gas streams to remove carbon dioxide and hydrogen sulfide and in which carbonyl sulfide is converted to carbon dioxide and hydrogen sulfide for in situ absorption.

In the processing of natural gas streams the ethanolamines, such as monoethanolamine, diethanolamine and triethanolamine, are commonly used as aqueous based absorbents for carbon dioxide and hydrogen sulfide, with diethanolamine being discussed for illustrative purposes.

Carbonyl sulfide, a component in natural gas streams, is regarded as a most unwanted impurity and difficult to absorb. However, above 140° F, and more typically at 160° F or higher, carbonyl sulfide will undergo hydrolysis in the presence of water by the reaction:

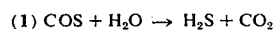

(1) $COS + H_2O \rightarrow H_2S + CO_2$

Although the products of this reaction are absorbable, at such temperatures, the capacity of a diethanolamine solution to absorb large quantities of hydrogen sulfide and carbon dioxide is low.

To increase the amount of hydrogen sulfide and carbon dioxide recovery per unit volume of diethanolamine, in accordance with the practice of this invention, there is, as shown in the Drawing, typically employed a contactor 10, comprising generally a mass absorption zone 12, an absorption-reaction zone 14 and a final absorption zone 16 isolated fluidwise from zone 14 by a unilateral gas flow device, such as a total trap-out tray 17.

A diethanolamine absorption solution, lean with respect to hydrogen sulfide and carbon dioxide and containing at least about 10 per cent and preferably about 20 to about 30 weight per cent diethanolamine, is typically continuously fed from a stripping unit 18, in which it is heated to above the hydrolysis temperature of carbonyl sulfide by circulation through exchanger 20, which provides the total heat input to the system.

The stream from the stripping unit is split into a first stream 22 which enters the absorption-reaction zone 14 at a temperature from about 140° to about 190° F, preferably from about 160° to about 190° F. The balance of the lean diethanolamine stream 24 is then typically cooled by water cooler 26 and fed to the upper level of the final absorption zone 16. The cooled diethanolamine solution, once it has passed in countercurrent flow with the process gas from zone 14, bypasses the absorption-reaction zone 14 and is combined at 28 with the absorption fluid flowing countercurrently to the process gas flow from the absorption-reaction zone 14 to become the absorption fluid for the mas absorption zone 12. The combined stream is at some net intermediate temperature conducive to high absorptivity of carbon dioxide and hydrogen sulfide per unit volume of diethanolamine solution.

Since the fluid flow from absorption zone 16 is largely used to adjust temperature to provide a net fluid flow conducive to mass absorption zone 12, the temperature at the base of mass absorption zone 12 need not be substantially greater than if the hydrolysis zone had not been provided. To achieve suitable tempering, the flow to zone 16 exceeds the flow to zone 14 and should preferably be twice and more preferably two to four or more times the rate of flow through zone 14.

After being used to process a gas stream, the spent absorption fluid is stripped of entrained hydrogen sulfide and carbon dioxide and recycled, using conventional stripping systems as illustrated in the Drawing.

During treatment the process gas stream, in this illustration a natural gas stream, enters the contactor 10 at point 30 of the mass absorption zone 12. There it undergoes mass absorption in countercurrent vapor-liquid contact with the combined absorbents from zones 14 and 16 which are normally at a net temperature from about 125° to about 160° F. In this zone some 85 to 90 per cent of the hydrogen sulfide and carbon dioxide entrained in the natural gas stream is absorbed before material hydrolysis has initiated.

After passing through the mass absorption zone 12, the gas stream enters the absorption zone 14 where it is heated to a temperature between 140° and about 190° F, more preferably from about 160° to about 190° F, and retained in contact with the absorption solution for a period of time sufficient for the hydrolysis reaction to occur. Residence time will vary depending on the component to be reacted and its concentration in the gas stream. In the case of a typical natural gas stream, residence times in the order of from 0.5 to about 2 minutes are anticipated.

While this zone is mainly relied on for the hydrolysis reaction under controlled flow and temperature conditions which maximize the conversion of carbonyl sulfide to carbon dioxide and hydrogen sulfide, some absorption will also occur since the absorbent passing through zone 16 is lean with respect to hydrogen sulfide and carbon dioxide.

After hydrolysis is complete, the gas stream is passed through the total trap-out tray 17 to the final absorption zone 16 where it contacts countercurrent flowing lean absorption fluid and where the formed hydrogen sulfide and carbon dioxide, as well as any hydrogen sulfide and carbon dioxide which escaped absorption in zones 12 and 14, is absorbed.

The treated gas is then normally passed through a knockout drum 32 to remove any entrained moisture and on to further processing or use.

The quantity of absorption fluid passing through the final absorption zone 16 is generally lean and in excess of that required to absorb the carbon dioxide and hydrogen sulfide leaving zone 14. When combined with liquid from zone 14 at point 30 there is provided an absorption solution fluid only partially saturated with respect to hydrogen sulfide and carbon dioxide. The effect of the process of this invention is that the net overall circulation of absorbent, based on equilibrium conditions, is substantially reduced to the level which would have existed in the absence of the hydrolysis reaction.

As indicated, the hydrogen sulfide-carbon dioxide-rich spent absorption fluid is then typically treated in a manner commonly used in the absorption art to extract the entrained gases and to recover the absorbent as lean absorbent for reuse in the contactor. A convenient method is to pass the spent absorption solution from the bottom of the contactor 34 to a flash gas tank 36 where hydrocarbons, physically co-absorbed in the absorbent system at the operating pressures employed, are released through a reduction in pressure. Since some hydrogen sulfide and carbon dioxide may also be released, a portion of the lean absorbent is continually diverted to flow countercurrent with the flash gas to reabsorb the released hydrogen sulfide and carbon dioxide to preclude their loss from the system. The spent absorbent and any added lean absorbent is then passed through heat exchanger 38 and to steam stripper 18 where the absorbed fluid is steam stripped free of hydrogen sulfide and carbon dioxide and exits as lean absorbent for use in the contactor.

Although the process of this invention has been described in the terms of the treatment of natural gas with diethanolamine, it is within the scope of this invention to treat any gas stream where it is desired to absorb certain constituents and react others to absorbable constituents. It is utile, for instance, in processes where there is employed both physical and chemical absorbents, such as the ethanolamines, glycols, n-methyl-2-pyrrolidone and the like.

The temperatures used within the absorption and absorptionreaction zones and the mass absorption zone may also vary widely, depending on the gas processed and the temperature at which the desired reaction is conducted. Operating pressure may also vary widely depending on the gas stream to be processed. In the processing of natural gas streams, operating pressures in the order of 700 psi and more typically pressures above 900 psi are contemplated.

The manner of fluid flow to the contactor may also be varied. For instance, although it is generally required that lean absorbent be fed to zone 16, the absorption fluid fed to zone 14 may be partially lean, taken, for instance, from the mid-point of the stripper 18. This will facilitate reducing overall operating costs where the reactant content of the gas stream is low but the concentration of other absorbable constituents is fairly high. Part of the split-off absorbent stream may also be fed directly to zone 12, or in the alternative, a split-off, partially lean absorbent fluid may be fed directly to zone 12 while lean absorbent fluid is fed to zones 14 and 16.

As illustrated in the Drawing, the temperature of the fluid flowing to zone 14 may also be modulated or controlled by diluting it with the cooled fluid flowing to zone 16.

Although the contactor used in this invention is shown to have trays, it will be well understood by one skilled in the art that packings, such as Pall rings, saddle rings, Raching rings, shower decks, bubble caps and the like, may be used instead so long as the manner of flow herein set forth is maintained.

It should also be understood that in the scope of this invention, where a large size unit is desired, the contactor of this invention may be essentially separated into three connecting units comprising the mass absorption zone, the absorption-reaction zone and the final absorption zone interconnected to establish flow identical to that described above.

EXAMPLE

As a specific illustration of this invention, there is treated in the contactor a natural gas having a composition shown in Table I.

TABLE I

| Component, Mols per Hour | Raw Gas |
|---|---|
| Hydrogen sulfide | 300 |
| Carbon dioxide | 134 |
| Nitrogen | 160 |
| Methane | 2,911 |
| Ethane | 195 |
| Propane | 124 |
| i-butane | 39 |
| n-butane | 73 |
| i-pentane | 12 |
| n-pentane | 8 |
| $C_6$ | 6 |
| $C_7+$ | 1 |
| Carbonyl sulfide | 3.39 |

The gas enters contactor, as shown in the Drawing, below the bottom tray at a temperature of about 115° F and a pressure of 950 psig. Lean diethanolamine of a single composition enters the contactor at the top of the absorption-reaction zone at a temperature of 155° F and at the top of the final absorption zone at a temperature of 125° F. The division of flow is 20 per cent to the absorption-reaction zone and 80 per cent to the final absortion zone at a total flow of 465 gallons per minute of 27.5 weight per cent solution of diethanolamine in steam condensate. The temperature of the combined streams at the top of the mass absorption zone is about 132° F where it absorbs the major amount of the hydrogen sulfide and carbon dioxide contained in the natural gas stream. The partially treated gas leaving the mass absorption zone is at a temperature close to 132° F as it enters the absorption-reaction zone where it is heated to 155° F and maintained in the zone for a sufficient time to permit the hydrolysis of carbonyl sulfide to carbon dioxide and hydrogen sulfide in the presence of water. The gas then enters the final absorption zone where any remaining hydrogen sulfide and carbon dioxide, not removed in the preceding zone, is absorbed. The gas enters at a temperature close to 155° F and leaves at a temperature of about 125° F.

Table II lists the composition of the treated gas stream on an hourly basis.

TABLE II

| Component, Mols per Hour | Treated Gas |
|---|---|
| Hydrogen sulfide | (1) |
| Carbon dioxide | (2) |
| Nitrogen | 160 |
| Methane | 2,902 |
| Ethane | 194 |
| Propane | 124 |
| i-butane | 39 |
| n-butane | 73 |
| i-pentane | 12 |
| n-pentane | 8 |
| $C_6$ | 6 |
| $C_7+$ | 1 |
| Carbonyl sulfide | 0.50 |

(1) Less than one-quarter green $H_2S$ per 100 SCF treated gas.
(2) 500 to 1,000 ppm $CO_2$ by volume.

What is claimed is:

1. A continuous process for treating natural gas streams containing hydrogen sulfide, carbon dioxide and carbonyl sulfide which comprises:
   a. contacting the gas stream in a countercurrent flow with an aqueous ethanolamine solution as an absorbent for carbon dioxide and hydrogen sulfide in a first absorption zone at a net temperature at which the capacity of the absorbent for hydrogen sulfide and carbon dioxide per unit volume is high;
   b. passing the gas stream from said first absorption zone to a second absorption-reaction zone where it is brought in countercurrent contact with an aqueous ethanolamine solution maintained at a temperature at which carbonyl sulfide will hydrolyze in the presence of water to hydrogen sulfide and carbon dioxide;
   c. passing said gas stream through a third absorption zone where it is brought into countercurrent contact with a cooled, lean aqueous ethanolamine solution for absorption of formed hydrogen sulfide and carbon dioxide and any carbon dioxide and hydrogen sulfide not absorbed in said first zone and second absorption-reaction zone; and
   d. combining the aqueous solution from said third absorption zone with the aqueous solution from said second absorption-reaction zone and passing said combined streams to said first absorption zone.

2. A process as claimed in claim 1 in which the aqueous ethanolamine solution is a diethanolamine solution.

3. A process as claimed in claim 2 in which the aqueous absorption solution contains diethanolamine in an amount from about 10 to about 30 weight per cent.

4. A process as claimed in claim 1 in which said absorption-reaction zone is maintained at a temperature of from about 140° to about 190° F.

5. A process as claimed in claim 1 in which said absorption-reaction zone is maintained at a temperature of from about 160° to about 190° F.

6. A process as claimed in claim 1 in which the rate of flow of absorption solution through said third absorption zone is from about 2 to about 4 times the rate of flow of absorption solution through said absorption-reaction zone.

* * * * *

UNITED STATES PATENT AND TRADEMARK OFFICE
CERTIFICATE OF CORRECTION

PATENT NO. : 3,961,015
DATED : June 1, 1976
INVENTOR(S) : Lawrence W. Dailey

It is certified that error appears in the above-identified patent and that said Letters Patent are hereby corrected as shown below:

Column 4, line 5, "30" should read --28--.

Column 4, line 44, after "absorption"

- insert -- - --.

Signed and Sealed this

Tenth Day of August 1976

[SEAL]

Attest:

RUTH C. MASON
Attesting Officer

C. MARSHALL DANN
Commissioner of Patents and Trademarks